(12) United States Patent
Solomon et al.

(10) Patent No.: US 6,356,986 B1
(45) Date of Patent: Mar. 12, 2002

(54) METHOD AND APPARATUS FOR ANALYZING A MAIN MEMORY CONFIGURATION

(75) Inventors: Tony Solomon; Yan Li, both of Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/291,187

(22) Filed: Apr. 14, 1999

Related U.S. Application Data

(62) Division of application No. 08/723,953, filed on Sep. 26, 1996, now Pat. No. 5,960,462.

(51) Int. Cl.$^7$ .......................... G06F 12/00; G06F 13/00
(52) U.S. Cl. .......................... 711/157; 711/5; 711/118; 711/127; 711/154; 711/172
(58) Field of Search .................. 711/5, 118, 127, 711/154, 157, 172

(56) References Cited

U.S. PATENT DOCUMENTS

| | | | |
|---|---|---|---|
| 5,237,674 A | * 8/1993 | Mohme et al. | 711/115 |
| 5,293,607 A | 3/1994 | Buockmann et al. | |
| 5,301,278 A | 4/1994 | Bowater et al. | |
| 5,341,486 A | * 8/1994 | Castle | 711/5 |
| 5,765,182 A | * 6/1998 | Lau et al. | 711/157 |
| 5,765,212 A | * 6/1998 | Yamada | 711/157 |
| 5,930,819 A | * 7/1999 | Hetherington et al. | 711/127 |
| 5,978,887 A | * 11/1999 | Yeager | 711/127 |
| 6,199,202 B1 | * 9/2000 | Borkenhagen et al. | 711/127 |

\* cited by examiner

*Primary Examiner*—Tuan V. Thai
(74) *Attorney, Agent, or Firm*—Kenyon & Kenyon

(57) ABSTRACT

A method and apparatus for analyzing the configuration of a computer main memory. A complex memory controller, which imposes restrictions on the memory's configuration, determines whether a user-selected configuration is consistent with those restrictions. The results of the determination are then reported to the user. The results may also be used to program the memory controller.

21 Claims, 2 Drawing Sheets

METHOD AND APPARATUS FOR ANALYZING A MAIN MEMORY CONFIGURATION

The present application is a divisional application of U.S. patent application Ser. No. 08/723,953 filed Sep. 26, 1996 now U.S. Pat. No. 5,960,462.

FIELD OF THE INVENTION

The present invention relates generally to computer memory, and more specifically to the configuration analysis of a computer main memory by a complex memory controller.

BACKGROUND INFORMATION

Memory interleaving is a technique which allows parallel or pipelined access of contiguous memory words in a computer memory bank. The goal of memory interleaving is to reduce the time required to perform a block access of computer main memory. Block accesses are useful for, e.g., fetching sequences of instructions or accessing linearly-ordered data structures.

Memory interleaving is accomplished by organizing a multi-row main memory bank such that contiguous memory addresses are spread across the rows. Thus, for example, if memory location n is in row 1, memory location n+1 is in row 2. Although each memory module, when presented with an address, can return only one memory word per cycle, if different addresses are presented to different memory modules simultaneously, or in a pipelined fashion, during a single memory cycle, a memory word can be returned from each. By organizing consecutive memory addresses across different rows, then, a contiguous block of memory can be accessed in one memory cycle. A memory configured to allow parallel or pipelined access of a block of m contiguous words is said to have m:1 interleaving.

Prior to the use of interleaving, computer memories were fairly straightforward to configure. Whenever a computer user desired to add a memory module to a computer memory board, he simply plugged it into the next available slot on the board.

Further memory modules were likewise added to the memory slots sequentially, until all slots were filled.

However, with the advent of memory systems which utilize interleaving and provide more complex main memories with, e.g., multiple memory banks, memory configuration has become more complex. Memory modules can be installed in various configurations in such systems, not all of which are equally desirable from a performance perspective. Some configurations, for example, may result in a higher memory interleaving value (and thus more efficient memory block accesses) than others. Furthermore, memory controllers in such complex memory systems, such as that in the Intel® 82450GX chipset, may place restrictions on memory configuration to enhance performance, including, e.g., restrictions regarding where additional memory modules can be installed and what types of modules (with respect to size, speed, etc.) can be used.

Thus, the configuration of a memory in a complex memory system can be a difficult task. While user manuals and other instructional materials supplied with complex memory boards provide guidance for the user as to allowable and optimal memory configurations, the user might not consult these materials prior to the installation of memory modules. If the user configures the memory improperly, some or all of the memory modules may be ignored by the computer's memory controller and thus be rendered inoperative. The user may not realize that such performance deficiencies are a result of the memory configuration and may believe incorrectly that the computer system is defective. It is desired, then, to provide a capability for assessing a memory configuration and informing the user of errors and other performance data relating to that configuration.

SUMMARY OF THE INVENTION

The present invention provides a method and apparatus for analyzing the configuration of a computer main memory. A memory controller, which imposes restrictions on the memory's configuration, determines whether a configuration is consistent with those restrictions. The results of the determination are then reported to the user.

In further embodiments of the present invention, the memory controller assesses a memory configuration's compliance with interleave restrictions, memory row size restrictions, and memory speed restrictions. In addition to reporting restriction non-compliance, the memory controller can also assess and report whether a particular configuration is optimal.

DETAILED DESCRIPTION

Figure 1:
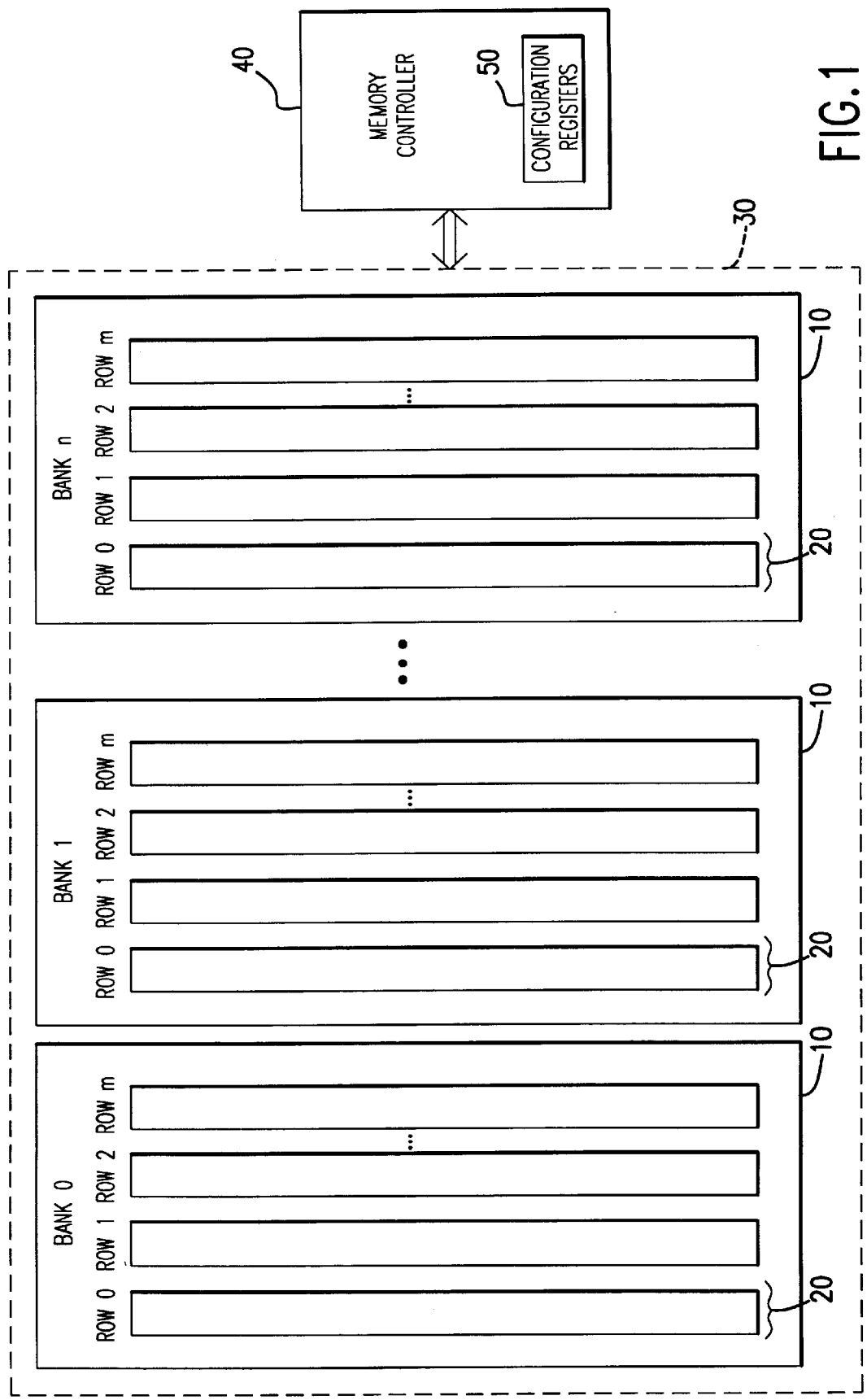
FIG. 1 is a block diagram of a memory system comprised of a memory controller and multi-bank main memory, such as is implemented in the Intel® 82450GX chipset.

FIG. 1 depicts a memory system comprised of a memory controller and multi-bank computer main memory, such as is implemented in the Intel® 82450GX chipset. The main memory depicted in FIG. 1 contains n+1 memory banks 10, each having m+1 rows 20. The Intel® 82450GX chipset's main memory, e.g., includes eight memory banks 10, each having four rows 20. The memory controller 40 includes a set of configuration registers 50, in which data relating to the main memory's configuration is stored.

The determination of whether a particular memory configuration is allowable, and, if allowable, is optimal from a performance perspective, must be made based upon the configuration rules imposed by the complex memory controller in a memory system. The Intel® 82450GX chipset's complex memory controller, for example, imposes the following rules: (1) all populated rows within a memory bank must have memory modules of the same size (e.g., all must be 16 megabytes or all must be 32 megabytes), however row size may differ from bank to bank; (2) all memory modules within the main memory must be consistent with regard to speed; (3) the memory interleave must be the same from bank to bank, for those banks which are populated (i.e., empty banks are exempted) and the same memory rows within each bank must be populated (e.g., if bank 0 has 2:1 interleaving, implemented by populating rows 0 and 2, then any other banks which contain memory modules must also have 2:1 interleaving with rows 0 and 2 populated).

Figure 2:
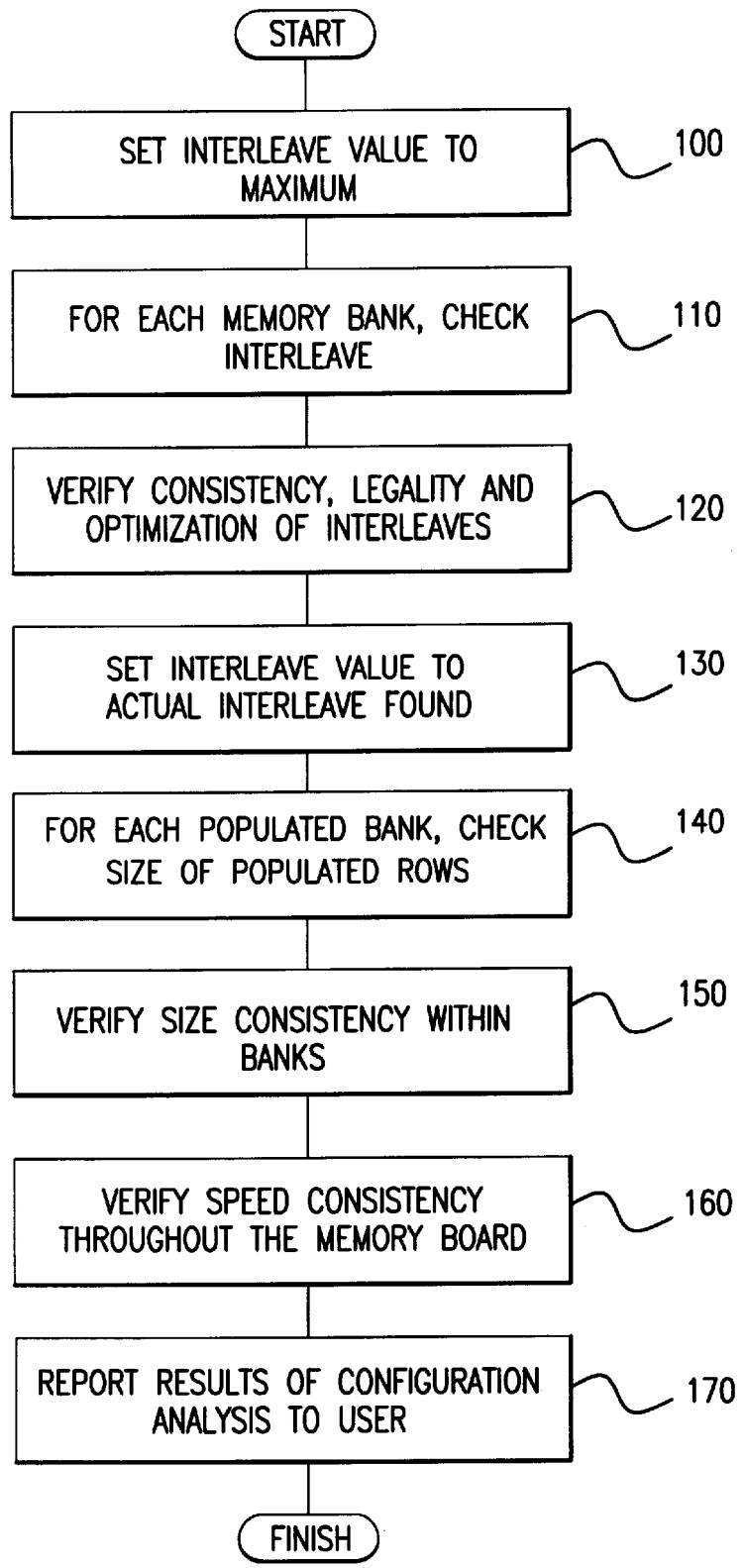
FIG. 2 is a flow chart depicting the steps performed in analyzing a main memory configuration according to the present invention.

FIG. 2 depicts the steps performed in analyzing a memory configuration according to the present invention. In an exemplary embodiment of the invention, these steps are performed by the complex memory controller within the Intel® 82450GX chipset, as part of the power-on self-test process.

The configuration analysis depicted in FIG. 2 includes assessment of the configuration's compliance with interleave, size and speed restrictions. In order to assess interleave compliance, the memory interleave value within the configuration registers is initially set to the maximum possible interleave for banks in the memory (step 100). For example, in the Intel® 82450GX chipset, the maximum interleave value is 4, because there are 4 rows within each bank. Setting the interleave value to the maximum allows the memory controller to access each memory row within each of the memory banks.

The memory controller then enables each memory bank in turn and, for each, checks the interleave within the bank (step 110) by performing a block write and readback operation. A block write and readback operation entails writing a block of data to the bank large enough to fill one memory line in each row. In the Intel® 82450GX chipset, for example, each row is two DWORDs (i.e., 32 bits) wide, and thus 8 DWORDs would need to be written in order to fill one line of memory in each of the four rows within a bank.

After writing the data, the data is read back. By comparing the data that was written with the data that is read back, it is possible to discern which rows within the bank actually contain memory. For example, if, after writing and reading 8 DWORDs in an Intel® 82450GX chipset memory bank, it is determined that only the first, second, fifth, and sixth of the 8 DWORDs were returned unchanged, then only the first and third rows (i.e., rows 0 and 2) of that memory bank are populated with memory modules. The interleave value for that bank is equal to the number of rows found to be populated. The interleave value for the example given, therefore, is 2:1.

After the interleave data—the interleave value and the interleave arrangement (i.e., the populated rows)—for each memory bank within the memory board is determined, the memory controller assesses the consistency, optimization, and legality of the interleave data for each of the banks (step 120). A consistency analysis entails comparing the interleave data for each of the populated banks. If the interleave values are not the same, a single interleave value must be chosen as the controlling value for the board and stored in the memory controller's configuration register. In an exemplary embodiment of the present invention, implemented in the Intel® 82450GX chipset, the interleave value in the first memory bank (i.e., bank 0) is chosen as the controlling value in cases of inconsistency. A consistency analysis further entails comparing the interleave arrangements for each of the populated banks, choosing one interleave arrangement as controlling and storing this information in the memory controller's configuration register.

Once an interleave value and arrangement are chosen, they are stored in the memory controller's configuration register (step 130). Any memory banks with a higher interleave value are allocated the chosen value, and any banks with a lower interleave value are rendered inoperative by the memory controller. Furthermore, all banks with interleave arrangements inconsistent with the chosen interleave arrangement are made to conform to the chosen arrangement if possible (e.g., by disabling certain rows within a bank), and if not, are rendered inoperative.

An illegality assessment includes, e.g., checking for a disallowed interleave value. The Intel® 82450GX chipset, for example, allows interleave values of 1:1, 2:1, and 4:1, but does not allow an interleave of 3:1. If an interleave value of 3:1 is found for any of the banks, this illegality is included in the memory controller's report to the user.

The optimization assessment entails reporting to the user information regarding a less than optimal interleave configuration of the memory board. For example, if the user populated one row in each of two banks, giving each bank an interleave of 1:1, the memory controller might report to the user that he should, instead, populate two rows within a single bank, resulting in a 2:1 interleave.

Following the interleave analysis (steps 100–130), the memory size consistency within each of the populated banks is determined (step 140). As discussed above, in the Intel® 82450GX chipset, the memory rows within a particular memory bank must be the same size (i.e., have the same number of bytes of storage space); however, row size need not be consistent from bank to bank.

Determination of the row sizes within a bank is made using a memory aliasing operation. Memory aliasing is a phenomenon whereby data that is written to a memory address that surpasses the available memory capacity (i.e., to a non-existent memory address) is echoed back into the first memory location within the bank.

In a memory system, such as that in the Intel® 82450GX chipset, allowing memory only in 4 megabyte increments, the memory row size determination is made by checking for aliasing at 4 megabyte intervals. (Of course, if a particular memory system allows implementation of memory in other than 4 megabyte increments, the aliasing check can be performed at the smallest memory increment allowed by the system). This entails writing data to each of the populated rows at a location 4 megabytes after the first memory line of the row, and reading from the first memory location in the memory bank. If the written data is found to have been echoed back into this first memory location, then at least one of the populated rows contains only 4 megabytes of data. If no aliasing is found (i.e., no data was echoed back), a second data write is made to the data lines 8 megabytes past the first data line in each row, and another aliasing check is made. This process is continued until aliasing is detected. At that point, the minimum size of the populated rows within the bank has been determined.

Once the minimum row size has been found, a determination must be made as to whether all populated rows within the bank are this same size. This is done by, e.g., reading from the last address written to (i.e., the first address found to produce aliasing). If any row returns the data that was written, indicating that that row actually has memory at that address, then that row has a higher data capacity (i.e., is a larger size) than the minimum determined row size. Row size consistency can also be checked by, e.g., writing individually to each of the populated rows at the last address written to and checking for aliasing. If all rows produce aliasing, then all are the same size. If any row does not produce aliasing, then that row is larger than the minimum determined row size.

A further configuration assessment that can be performed by the memory controller is a determination as to the speed consistency of the memory modules within the banks (step 160). Determination of the speeds of the memory modules is made by, e.g., the hardware on the memory board, which reads the memory speeds from the memory modules, and stores the data where it can be read by the memory controller. The memory controller reads this data to determine whether memory module speeds are consistent bank to bank.

After the memory controller analyzes the interleaving, size and speed data for the memory board configuration, a report summarizing the analysis is made to the user (step 170). The memory controller reports, for example, information as to any illegalities or inconsistencies found in the configuration, such as illegal interleaving values, inconsistencies in interleave data among banks, or inconsistencies in row size within a bank. The memory controller can also report, e.g., information regarding less improvements.

What is claimed is:

1. A method of configuring a memory comprising:
    writing a block of test data to each memory bank in a plurality of memory banks;
    reading back the block of test data from each memory bank;
    initializing an individual interleave value for each memory bank based on the number of rows in each memory bank found to be populated with the test data;
    setting a controlling interleave value to a maximum interleave value;
    comparing the controlling interleave value to the individual interleave value of each memory bank;
    disqualifying those memory banks whose individual interleave value cannot be reconfigured to be consistent with the controlling interleave value; and
    generating a report identifying the disqualified memory banks.

2. The method of claim 1, wherein the controlling interleave value is based on the individual interleave values and a predetermined interleave restriction of a memory controller.

3. The method of claim 2, wherein the predetermined interleave restriction includes disallowed interleave values.

4. The method of claim 2, wherein the controlling interleave value is further based on a speed of each memory bank and a predetermined memory speed restriction of the memory controller.

5. The method of claim 4, wherein the report further includes a comparison of the speed of each memory bank and the predetermined memory speed restriction.

6. The method of claim 1, further comprising:
    reconfiguring the individual interleave values of the remaining memory banks to be consistent with the controlling interleave value.

7. The method of claim 1, wherein the report identifies the reconfigured memory banks.

8. The method of claim 1, wherein the report includes suggestions for manually changing a memory bank configuration to improve the controlling interleave value.

9. The method of claim 8, further comprising observing the report and changing the memory bank configuration to improve the controlling interleave value.

10. The method of claim 1, wherein the reconfiguring step further comprises:
    setting the individual interleave value of each reconfigured memory bank to be equal to the controlling interleave value.

11. The method of claim 1, wherein the method is performed during a self-test operation.

12. The method of claim 1, further comprising:
    storing the controlling interleave value in a configuration register.

13. In a memory system implementing interleaving restrictions in a memory, a memory configuration analysis apparatus comprising:

means for writing a block of test data to each memory bank;
    means for reading back the block of test data from each memory bank;
    means for initializing an interleave factor of each memory bank based on the number of rows in each memory bank found to be populated with the test data;
    means for selecting a controlling interleave value for the memory;
    means for disqualifying memory banks having an individual interleave value inconsistent with the controlling interleave value;
    means for reconfiguring the individual interleave values of the remaining memory banks to be consistent with the controlling interleave value;
    means for analyzing the interleave values of the deactivated and reconfigured memory banks; and
    means for reporting the analysis to a user.

14. The memory configuration analysis apparatus of claim 13, further comprising:
    means for observing the reported analysis; and
    means for changing a memory bank configuration to improve the controlling interleave value.

15. A configurable memory system, comprising:
    a plurality of memory banks;
    a memory controller coupled to the memory banks, the memory controller configured to:
        write a block of test data to each memory bank;
        read back the block of test data from each memory bank;
        initialize an interleave factor of each memory bank based on the number of rows in each memory bank found to be populated with the test data;
        set a controlling interleave factor to a maximum interleave factor;
        compare the interleave factor of each memory bank to the controlling interleave factor;
        disqualify those memory banks whose interleave factors cannot be reconfigured to be consistent with the controlling interleave factor; and
        generate a report identifying the disqualified memory banks.

16. The system of claim 15, wherein the controlling interleave factor is based on the interleave factor of each memory bank and a predetermined interleave restriction of the memory controller.

17. The system of claim 15, wherein the memory controller is further configured to:
    reconfigure the interleave factors of the remaining memory banks to be consistent with the controlling interleave factor.

18. The system of claim 15, wherein the report identifies the reconfigured memory banks.

19. Thee system of claim 15, wherein the report includes suggestions for manually changing a memory bank configuration to improve the controlling interleave factor.

20. The system of claim 15, wherein the predetermined interleave restriction includes disallowed interleave values.

21. The system of claim 15, wherein the controlling interleave factor is stored in a configuration register.

* * * * *

UNITED STATES PATENT AND TRADEMARK OFFICE
CERTIFICATE OF CORRECTION

PATENT NO. : 6,356,986 B1
DATED : March 12, 2002
INVENTOR(S) : Solomon et al.

It is certified that error appears in the above-identified patent and that said Letters Patent is hereby corrected as shown below:

Title page, Item [54] and Column 1, lines 1-3,
Title, change "METHOD AND APPARATUS FOR ANALYZING A MAIN MEMORY CONFIGURATION" to -- A METHOD AND APPARATUS FOR ANALYZING A MAIN MEMORY CONFIGURATION TO PROGRAM A MEMORY CONTROLLER --

Column 4,
Line 5, change "less improvements." to -- less than optimal configurations, and provide suggestions for improvements. --

Signed and Sealed this

Twenty-ninth Day of April, 2003

JAMES E. ROGAN
*Director of the United States Patent and Trademark Office*